United States Patent
We

(10) Patent No.: US 11,335,085 B2
(45) Date of Patent: May 17, 2022

(54) ADVANCED DRIVER ASSISTANCE SYSTEM, VEHICLE HAVING THE SAME AND METHOD FOR CONTROLLING THE VEHICLE

(71) Applicants: HYUNDAI MOTOR COMPANY, Seoul (KR); KIA MOTORS CORPORATION, Seoul (KR)

(72) Inventor: Kyoungsoo We, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 169 days.

(21) Appl. No.: 16/600,954

(22) Filed: Oct. 14, 2019

(65) Prior Publication Data

US 2021/0004622 A1 Jan. 7, 2021

(30) Foreign Application Priority Data

Jul. 5, 2019 (KR) .......................... 10-2019-0081395

(51) Int. Cl.
*G06K 9/00* (2022.01)
*G06V 10/98* (2022.01)
(Continued)

(52) U.S. Cl.
CPC ............ *G06V 10/98* (2022.01); *G06V 10/147* (2022.01); *G06V 20/588* (2022.01); *G08G 1/167* (2013.01)

(58) Field of Classification Search
CPC ...... G06K 9/03; G06K 9/00798; G06K 9/209; G08G 1/167
See application file for complete search history.

(56) References Cited

U.S. PATENT DOCUMENTS 5,483,456 A * 1/1996 Kuwahara .............. G01C 21/30
701/469
6,930,593 B2 * 8/2005 Crawshaw ............. B60Q 9/008
348/148
(Continued)

FOREIGN PATENT DOCUMENTS

CN 106394403 A * 2/2017 ............. B60Q 9/00
DE 102019206569 A1 * 7/2020 ............. B60Q 9/005
(Continued)

OTHER PUBLICATIONS

DeepTest: Automated Testing of Deep-Neural-Network-driven Autonomous Cars, Yuchi Tian et al., arXiv, 1708.08559v2, 2018, pp. 1-12 (Year: 2018).*

(Continued)

*Primary Examiner* — Jayesh A Patel
(74) *Attorney, Agent, or Firm* — Slater Matsil, LLP

(57) ABSTRACT

An advanced driver assistance apparatus, a vehicle having the same, and a method of controlling the vehicle are provided. The vehicle may acquire a first image of a road by a first image acquisition unit while traveling, acquire a second image of the road by a second image acquisition unit while traveling, recognize a first lane in the first image by a first lane recognizer, recognize a second lane in the second image by a second lane recognizer, determine whether at least one of the first lane recognizer or the first image acquisition unit has a failure by comparing the first lane with the second lane, and output failure information when at least one of the first lane recognizer or the first image acquisition unit is determined to have the failure.

17 Claims, 11 Drawing Sheets

(51) Int. Cl.
*G08G 1/16* (2006.01)
*G06V 10/147* (2022.01)
*G06V 20/56* (2022.01)

(56) References Cited

U.S. PATENT DOCUMENTS

| | | | | |
|---|---|---|---|---|
| 9,542,846 B2* | 1/2017 | Zeng | | B60W 30/12 |
| 9,679,191 B1* | 6/2017 | Zhu | | G05D 1/0055 |
| 9,713,983 B2* | 7/2017 | Takaki | | B60R 1/00 |
| 9,855,894 B1* | 1/2018 | Khorasani | | B60K 35/00 |
| 10,293,819 B1* | 5/2019 | El-Khatib | | B60W 60/001 |
| 2004/0054467 A1* | 3/2004 | Sakai | | G01C 21/34 |
| | | | | 340/995.19 |
| 2005/0169500 A1* | 8/2005 | Takahashi | | G08G 1/0175 |
| | | | | 382/104 |
| 2005/0228587 A1* | 10/2005 | Kobayashi | | G06V 20/588 |
| | | | | 382/104 |
| 2008/0033642 A1* | 2/2008 | Emoto | | G01C 21/3638 |
| | | | | 701/436 |
| 2011/0273565 A1* | 11/2011 | Muramatsu | | H04N 5/23206 |
| | | | | 348/148 |
| 2012/0062745 A1* | 3/2012 | Han | | B62D 15/029 |
| | | | | 348/148 |
| 2013/0293717 A1* | 11/2013 | Zhang | | H04N 7/181 |
| | | | | 348/149 |
| 2015/0350607 A1* | 12/2015 | Kim | | H04N 7/181 |
| | | | | 348/148 |
| 2016/0027176 A1* | 1/2016 | Zeng | | G06T 7/80 |
| | | | | 348/148 |
| 2017/0021863 A1* | 1/2017 | Thompson | | B60R 1/00 |
| 2017/0043773 A1* | 2/2017 | Watanabe | | G08G 1/167 |
| 2017/0109590 A1* | 4/2017 | Gehrke | | H04N 17/002 |
| 2017/0147889 A1* | 5/2017 | Okano | | H04N 7/188 |
| 2017/0147891 A1* | 5/2017 | Satzoda | | H04N 7/181 |
| 2017/0267237 A1* | 9/2017 | Oyama | | B60W 10/18 |
| 2018/0134289 A1* | 5/2018 | Kokido | | B62D 6/00 |
| 2018/0253630 A1* | 9/2018 | Tamer | | H04N 5/247 |
| 2019/0193738 A1* | 6/2019 | Oh | | G08G 1/22 |
| 2019/0300014 A1* | 10/2019 | Nagase | | B60K 35/00 |
| 2019/0361118 A1* | 11/2019 | Murad | | G01S 17/48 |
| 2019/0369635 A1* | 12/2019 | Kobayashi | | B60W 50/023 |
| 2019/0382031 A1* | 12/2019 | Hu | | B60W 50/0205 |
| 2020/0001867 A1* | 1/2020 | Mizutani | | B60W 30/0956 |
| 2020/0285863 A1* | 9/2020 | Sadjadi | | G06T 7/73 |

FOREIGN PATENT DOCUMENTS

| | | | | |
|---|---|---|---|---|
| JP | 2002092796 A | * | 3/2002 | ......... G06K 9/00798 |
| KR | 20010009181 A | * | 2/2001 | |
| KR | 10-1428094 B1 | | 3/2010 | |
| KR | 10-1244353 B1 | | 3/2013 | |
| KR | 10-1692628 B1 | | 7/2016 | |
| KR | 20160089786 A | * | 7/2016 | |

OTHER PUBLICATIONS

Failing to Learn: Autonomously identifying Perception Failures for self-Driving Cars, Manikandasriram Srinivasan Ramanagopal et al., arXiv:1707.00051v4, 2018, pp. 1-8 (Year: 2018).*

* cited by examiner

ADVANCED DRIVER ASSISTANCE SYSTEM, VEHICLE HAVING THE SAME AND METHOD FOR CONTROLLING THE VEHICLE

CROSS-REFERENCE TO RELATED APPLICATION

The present application claims priority to and the benefit of Korean Patent Application No. 10-2019-0081395, filed on Jul. 5, 2019, which is incorporated herein by reference in its entirety.

TECHNICAL FIELD

The present disclosure relates to an advanced driver assistance device for recognizing a lane and providing driving assistance information to a driver based on the recognized information of the lane, a vehicle having the same, and a control method thereof.

BACKGROUND

The statements in this section merely provide background information related to the present disclosure and may not constitute prior art.

A vehicle is a machine that drives a wheel and travels on a road for the purpose of transporting people or cargo. Such a vehicle, when driving on a road, may cause an accident due to a failure of the vehicle itself, driver's carelessness, negligence of another vehicle or road condition.

Recently, various advanced driver assistance systems (ADAS) have been developed to transmit driving information of a vehicle to a driver or to perform autonomous driving for the convenience of a driver in order to prevent an accident caused by a driver's carelessness.

For example, there is a collision avoidance device that detects an obstacle around a vehicle and informs a driver of collision information with the vehicle based on distance information with the detected obstacle.

As another example, there is a parking assist device that acquires an image of the rear of the vehicle and displays the acquired image of the rear, when parking.

As another example, there is a lane departure warning device that recognizes a lane of a road on which a vehicle is traveling, determines whether the vehicle departures the lane based on the recognized information of the lane, and warns a driver when the lane departure is determined, As another example, there is autonomous driving control device that automatically recognize the road environment (road information, lanes, obstacles, traffic signals, etc.), determines the driving situation, and control the driving of the vehicle according to the planned driving route, thereby automatically driving to a destination.

Among these, when a failure occurs in the lane recognizing device, the risk of an accident increases due to a malfunction, and autonomous driving control becomes impossible.

In addition, when the autonomous driving continues without the recognition of the failure of the lane recognition device, a problem that leads to a large accident occurs.

SUMMARY

One aspect of the present disclosure provides an advanced driver assistance device, a vehicle having the same, and a control method thereof, configured to recognize a lane in the first and second images and to correct the information of the lane of the first image using the recognized information of the lane of the second image.

Another aspect provides an advanced driver assistance apparatus, a vehicle having the same, and a control method thereof, configured to recognize a lane in a first image and a second image, and to determine whether a lane recognition has failed by comparing information of the recognized lanes The advanced driver assistance device according to one aspect comprises a plurality of image acquisition units configured to acquire images of a road, respectively; a plurality of lane recognizers configured to connect to the plurality of image acquisition units, respectively, and to recognize lanes in an image of the connected image acquisition unit, respectively; a controller configured to determine whether at least one lane recognizer and the image acquisition unit connected to the at least one lane recognizer have a failure by comparing the information of each lane recognized by the plurality of lane recognizers, and to control the output of the failure information when the failure of the at least one of the lane recognizer and the image acquisition unit is determined; and an output unit for outputting failure information.

The advanced driver assistance device according to one aspect further comprises a position receiver configured to receive the current position information of any one of the image acquisition unit of the plurality of image acquisition unit; and a storage configured to store distance information between any one image acquisition unit and the remaining image acquisition unit, respectively, and to store visual field information of the plurality of image acquisition units.

The controller, when comparing the information of each lane recognized by the plurality of lane recognizers, identifies each image having the same position information as the current position information among the received current position information, the stored distance information with each remaining image acquisition unit, and the images acquired by the remaining image acquisition units based on the field of view information of the plurality of image acquisition units, and compares the information of the lane recognized in each of the identified image with the information of the lane in the image of any one image acquisition unit.

The advanced driver assistance device according to one aspect includes a position receiver configured to receive the current position information; and a storage configured to store the position information of the road and type of the road in the map. The controller determines whether to perform the failure determination mode based on the received current position information and stored road information.

At least two of the plurality of image acquisition units of the advanced driver assistance device according to one aspect includes acquiring images of roads in different directions.

The controller of the driver assistance device according to one aspect performs a lane departure warning or autonomous driving control based on the information of the lane recognized in the image of the road acquired by the remaining image acquisition unit.

According to another aspect of the present disclosure, a vehicle includes: a first image acquisition unit configured to acquire a first image of a road; a second image acquisition unit configured to acquire a second image of a road; a first lane recognizer configured to recognize a lane in the first image; a second lane recognizer configured to recognize a lane in the second image; and a controller configured to determine at least one failure of the first lane recognizer and the first image acquisition unit by compare the information of the lane recognized by the first lane recognizer with the information of the lane recognized by the second lane recognizer, and to determine whether the lane deviates based on the information of the lane recognized by the second lane recognizer when determined to be at least one failure.

The controller of the vehicle controls autonomous driving based on the information of the lane recognized by the second lane recognizer in the autonomous driving control mode.

The vehicle further includes an output unit including at least one of a display and a sound output unit, and the controller controls an operation of the output unit to output lane departure information when the lane departure is determined.

The first image acquisition unit of the vehicle is provided on the vehicle body and is provided so that the field of view faces forward, the second image acquisition unit of the vehicle is provided on the vehicle body and is provided so that the field of view faces backward, the first image is the front image of the road, and the second image is the rear image of the road.

The vehicle further includes a storage configured to store the distance information of the first image acquisition unit and the second image acquisition unit, the field of view information of the second image acquisition unit and length information of the vehicle body; and a detector configured to detect the driving speed.

The controller of the vehicle, when comparing the information of the lane recognized in the first and second images, identifies the first image acquired at the same position as the position of the road where the second image is acquired from among the first images acquired by the first image acquisition unit based on the acquired time information of the second image by the second image acquisition unit, the field of view information of the second image acquisition unit, the length information of the vehicle body and the detected driving speed, and compares the information of the lane recognized in the identified first image with the information of the lane recognized in the acquired second image.

The controller of the vehicle, when comparing the information of the lane recognized in the first and second images, compares the information of the lane in the first and second images based on the distance of the road in the image acquired by the image acquisition unit having the smaller view of the field of view of the first image acquisition unit and the field of view of the second image acquisition unit.

The vehicle further includes a position receiver configured to receive current position information; and a storage configured to store position information of the road and type of the road in the map. The controller of the vehicle determines whether to perform the failure diagnosis mode based on the received current position information and stored road information.

The controller of the vehicle, when determined to be at least one failure, corrects the information of the lane recognized by the first lane recognizer based on the information of the lane recognized by the second lane recognizer The vehicle further includes a detector configured to detect a driving speed, and the controller controls the execution of the failure diagnosis mode when the detected driving speed is equal to or greater than the reference driving speed.

The vehicle further includes a storage configured to store the first image acquired by the first image acquisition unit, and the storage has a storage capacity capable of storing the first image acquired in real time up to a point of time traveling by a distance corresponding to the length of the vehicle body at the reference driving speed.

According to another aspect of the present disclosure, a method for controlling a vehicle includes acquiring a first image of a road using a first image acquisition unit while traveling, acquiring a second image of a road using a second image acquisition unit while traveling, recognizing a lane in the first image acquired using a first lane recognizer, recognizing a lane in the second image acquired using a second lane recognizer, determining at least one failure of at least one of the first lane recognizer and the first image acquisition unit by comparing the information of the lane recognized in the first image with the information of the lane recognized in the second image, and outputting failure information when at least one failure of the first lane recognizer and the first image acquisition unit is determined.

According to another aspect of the present disclosure, a method for controlling a vehicle further includes determining whether the vehicle deviates from the lane based on the information of the lane recognized by the second lane recognizer when at least one failure of the first lane recognizer and the first image acquisition unit is determined, and controlling autonomous driving based on the information of the lane recognized by the second lane recognizer in the autonomous driving control mode.

Comparing the information of the lane recognized in the first image and the information of the lane recognized in the second image, includes identifying the driving speed information and time information when the second image is acquired by the second image acquisition unit; identifying the first image acquired at the same position as the position of the road where the second image was acquired among the first images acquired by the first image acquisition unit based on the identified time information, the pre-stored field of view information of the first image acquisition unit, the pre-stored length information of the vehicle body, and the identified driving speed information; and comparing the information of the lane recognized in the identified first image with the information of the lane recognized in the acquired second image.

According to another aspect of the present disclosure, a method for controlling a vehicle further includes identifying a driving speed, identifying a current position of a vehicle, identifying information of a road at the identified current position, and determining whether to perform the failure diagnosis mode based on at least one of the identified road information and driving speed.

According to another aspect of the present disclosure, a method for controlling a vehicle further includes correcting the information of the lane recognized by the first lane recognizer based on the information of the lane recognized by the second lane recognizer when determined to be at least one failure.

The present disclosure can easily determine the hardware failure of the at least one image acquisition unit and the lane recognizer, and can also easily determine the software failure such as misrecognition of lane recognition, by recognizing the lanes by image processing each image acquired through the at least two image acquisition units with each other and comparing the recognized lanes.

In addition, even if a failure occurs in any one of the image acquisition unit and the lane recognizer, the present disclosure can reduce the risk of accident by recognizing the lane using the normal image acquisition unit and the lane recognizer and warning the lane departure based on the information of the recognized lane, thereby improving safety while traveling, and can maintain the autonomous driving control during autonomous driving control, thereby improving user satisfaction.

According to the present disclosure, an implicit failure such as misrecognition of a front lane can be determined in a state where a hardware configuration is not added, thereby preventing a cost increase by adding a device for determining a failure of a lane recognition.

The present disclosure can provide a great convenience to the user, can improve the commerciality of the advanced driver assistance device and the vehicle, further increase the user's satisfaction, can improve the user's convenience, reliability and secure the competitiveness of the product.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
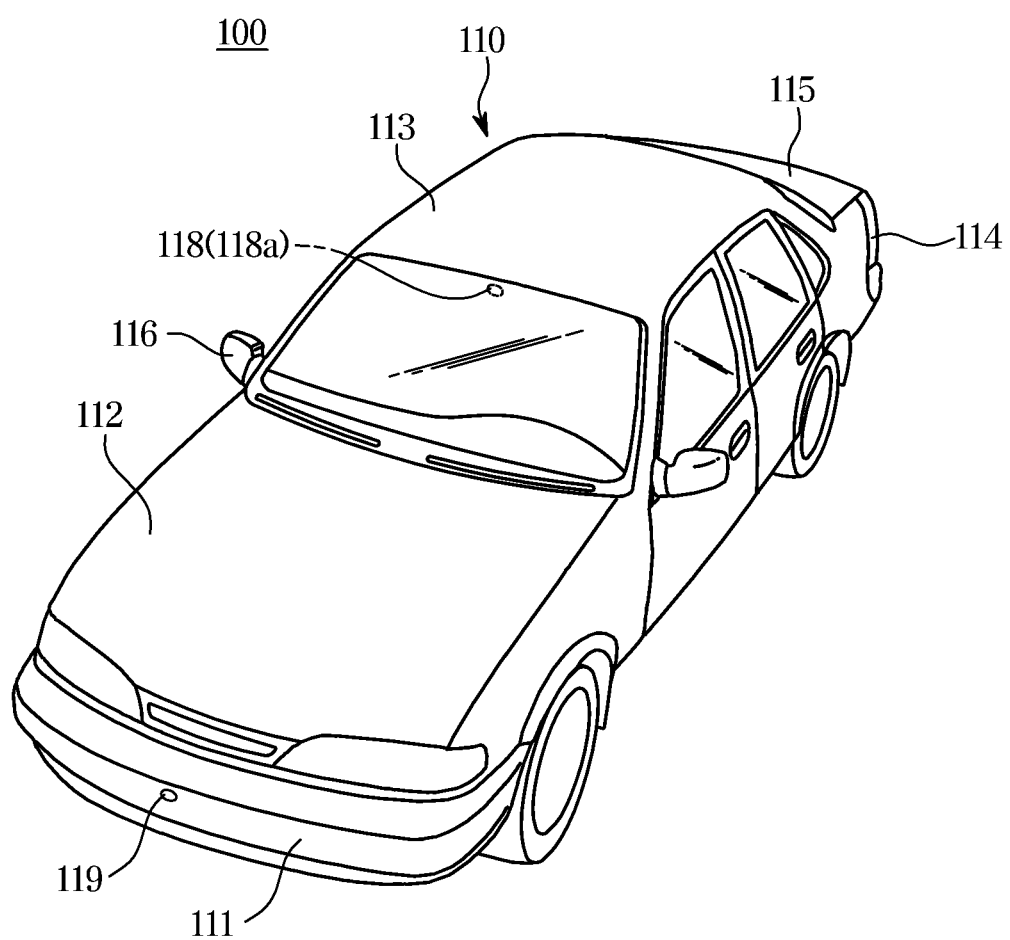
FIG. 1 is a diagram illustrating an appearance of a vehicle provided with an advanced driver assistance apparatus in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Terms such as "unit", "module", "member", and "block" may be embodied as hardware or software. In some forms of the present disclosure, a plurality of "unit", "module", "member", and "block" may be implemented as a single component or a single "unit", "module", "member", and "block" may include a plurality of components.

It will be understood that when an element is referred to as being "connected" another element, it can be directly or indirectly connected to the other element, wherein the indirect connection includes "connection via a wireless communication network".

Also, when a part "includes" or "comprises" an element, unless there is a particular description contrary thereto, the part may further include other elements, not excluding the other elements.

The terms first, second, etc. are used to distinguish one component from another component, and the component is not limited by the terms described above.

An expression used in the singular encompasses the expression of the plural, unless it has a clearly different meaning in the context.

The reference numerals used in operations are used for descriptive convenience and are not intended to describe the order of operations and the operations may be performed in a different order unless otherwise stated.

Hereinafter, some forms of the present disclosure will be described with reference to the accompanying drawings.

FIG. 1 is a diagram illustrating an appearance of a vehicle provided with an advanced driver assistance apparatus in some forms of the present disclosure.

The vehicle 100 includes a vehicle body having an exterior 110 and an interior, and a chassis for installing a mechanical device for traveling to the remaining portions except for the vehicle body.

The exterior of the vehicle body includes a glass provided to be opened and closed on a front panel 111, a bonnet 112, the roof panel 113, a rear panel 114, doors in front, rear, left and right, the tail gate 115, and a glass provided to be opened and closed on doors in front, rear, left and right, and a glass 116 fixed to the front and rear of the vehicle.

The exterior of the vehicle body includes a side mirror 117 that provides the driver with a field of view behind the vehicle 100.

The vehicle 100 may include a plurality of image acquisition units 118 that acquire images of a road.

The plurality of image acquisition units 118 in some forms of the present disclosure may acquire images of roads in different directions. For example, the plurality of image acquisition units may include a first image acquisition unit 118a configured to acquire an image of a road in front of the vehicle and a second image acquisition unit 118b (see FIG. 2) configured to acquire an image of a road behind the vehicle.

The first image acquisition unit 118a of the plurality of image acquisition units 118 may be provided in the window glass 116a on the front surface, but may be provided in the window glass inside the vehicle.

The first image acquisition unit 118a may be provided on the front panel 111, the room mirror or the roof panel 113 inside the vehicle, but may be provided to be exposed to the outside, and may be provided on a license plate on the front of the vehicle, a grill on the front of the vehicle, or an emblem on the front of the vehicle. In addition, the field of view of the first image acquisition unit provided in the roof panel 113 may be in front of the vehicle.

The second image acquisition unit 118b of the plurality of image acquisition units 118 may be provided in the window glass 116b on the rear side, but may be provided in the window glass inside the vehicle, and may be provided in the rear panel 114, the tail gate 115, a license plate on the rear of the vehicle or an emblem on the rear of the vehicle or the roof panel 113, but may be provided to be exposed to the outside. The field of view of the second image acquisition unit provided in the roof panel 113 may be the rear of the vehicle.

In addition, the second image acquisition unit 118b may be provided in the side mirror 117. In addition, the field of view of the second image acquisition unit provided in the side mirror may be the rear of the vehicle. The second image acquisition unit 118b may be plurality of numbers.

That is, the second image acquisition unit 118b may be provided in the left and right side mirrors 117 to acquire images of roads on the left and right sides and the rear of the vehicle.

In addition, the second image acquisition unit 118b may be provided in the left and right doors or the left and right fenders.

This is only one form of the present disclosure, and the first and second image acquisition units provided with vehicles may acquire images of roads in the same direction. For example, the first and second image acquisition units may both acquire an image in front of the vehicle.

The image acquisition unit 118 may include a CCD or CMOS image sensor as camera, and may include a three-dimensional spatial recognition sensor such as a RGB-D sensor (KINECT), a structured light sensor (TOF), a stereo camera, or the like.

The first image acquisition unit may be a camera of the lane departure warning device, the camera of the autonomous driving control device, the camera of the black box or the camera of the obstacle detection device and the second image acquisition unit may be a camera of the parking assist device and may include a camera of a peripheral monitoring device (SVM: Surround View Monitor or AVM), a camera of a blind spot detection device (BSD), or a camera of a rear detection device.

The exterior of the vehicle may be further provided with a distance detector 119 for detecting the distance to the front, rear, left and right obstacles. The distance detector may include a radar sensor or a lidar sensor (Light detection and Ranging).

The vehicle may further include a steering angle detector for detecting an angle of the steering wheel.

The exterior of the vehicle body further includes an antenna configured to receive signals from GPS satellites, broadcasting stations, etc., and to perform a wireless vehicle network (V2X: Vehicle to everything) such as communication with other vehicles (V2V) and communication with infrastructure (V2I), etc.

The interior of the vehicle body includes a seat on which the occupant sits; a dashboard; an instrument panel (i.e. cluster) placed on the dashboard, and provided with tachometer, speedometer, coolant thermometer, fuel gauge, turn indicator, high light indicator, warning light, seat belt warning light, odometer, odometer, shift lever light, door open warning light, engine oil warning light and fuel shortage warning light; a center fascia provided with a blower of an air conditioner and a throttle; and a head unit provided in the center fascia to receive operation commands of an audio device and an air conditioner.

The cluster may display lane departure warning information when the lane departure warning mode is performed, or may display lane recognition failure information.

The interior of vehicle may further include a terminal 120 that displays information on audio, video, navigation, DMB, and radio functions, displays lane departure information in lane departure warning mode, and displays images in front, rear, left and right directions in autonomous driving mode, and displays a map information and road guidance information. Such a terminal 120 may be installed on a dash board. The terminal 120 is also capable of receiving an operation command of various functions that can be performed in the vehicle. The terminal 120 for the vehicle may include a display panel as a display and may further include a touch panel as an input unit. That is, the terminal 120 for the vehicle may include a touch screen in which the touch panel is integrated with the display panel.

The interior of the vehicle may further include an input unit configured to receive input of an operation command of various functions that can be performed in the vehicle.

The input unit may be provided in the head unit and the center fascia, and may include at least one physical button such as an operation on/off button of various functions and a button for changing a setting value of various functions, and may further include a jog dial (not shown) or a touch pad for inputting a movement command and a selection command of a cursor displayed on the terminal 120.

The vehicle 100 may further include a display provided in the head unit and displaying information on a function being performed in the vehicle and information inputted by the user.

The chassis of the vehicle supports the body. Such a chassis may be provided with the wheels arranged in front, rear, left and right, a power device for applying driving force to the front, rear, left and right wheels, a steering device, a braking device for applying the braking force to the front, rear, left and right wheels and a suspension device for adjusting the suspension of the vehicle.

The vehicle 100 may be provided with a driver assistance device configured to assist the driver in driving for the safety and convenience of the user. The control configuration of such a vehicle will be described. The control configuration of such a vehicle will be described.

Figure 2:
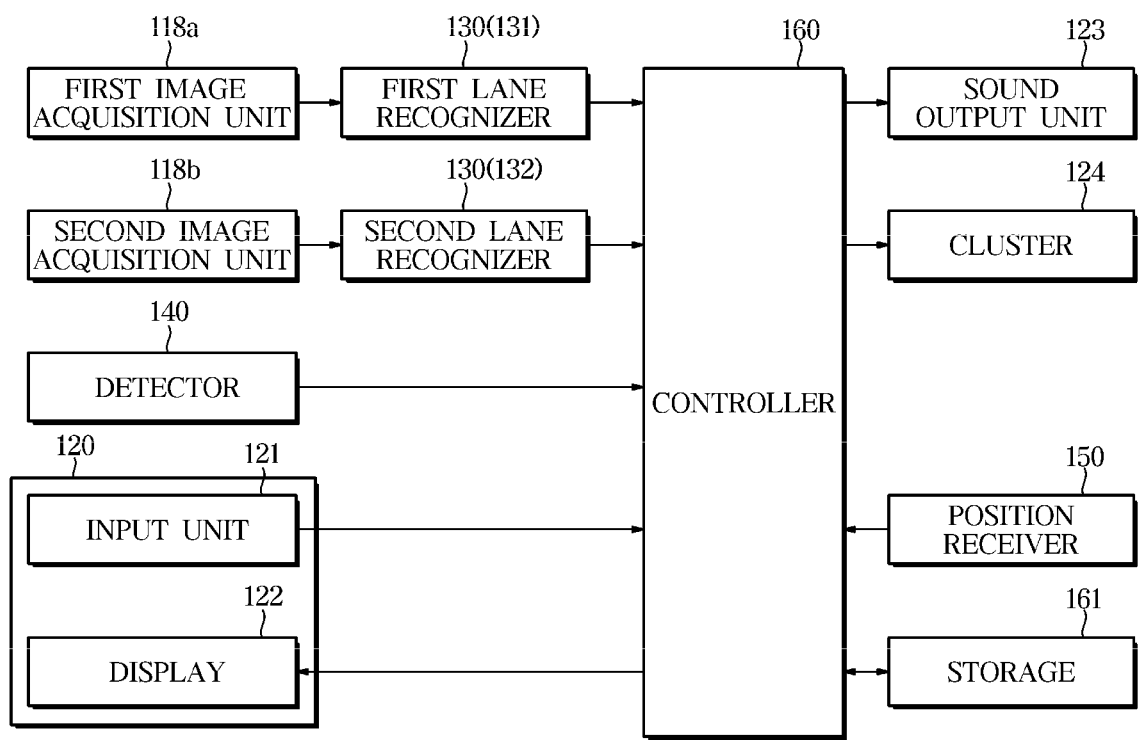
FIG. 2 is a control block diagram of a vehicle provided with an advanced driver assistance apparatus in one form of the present disclosure.
Figure 3:
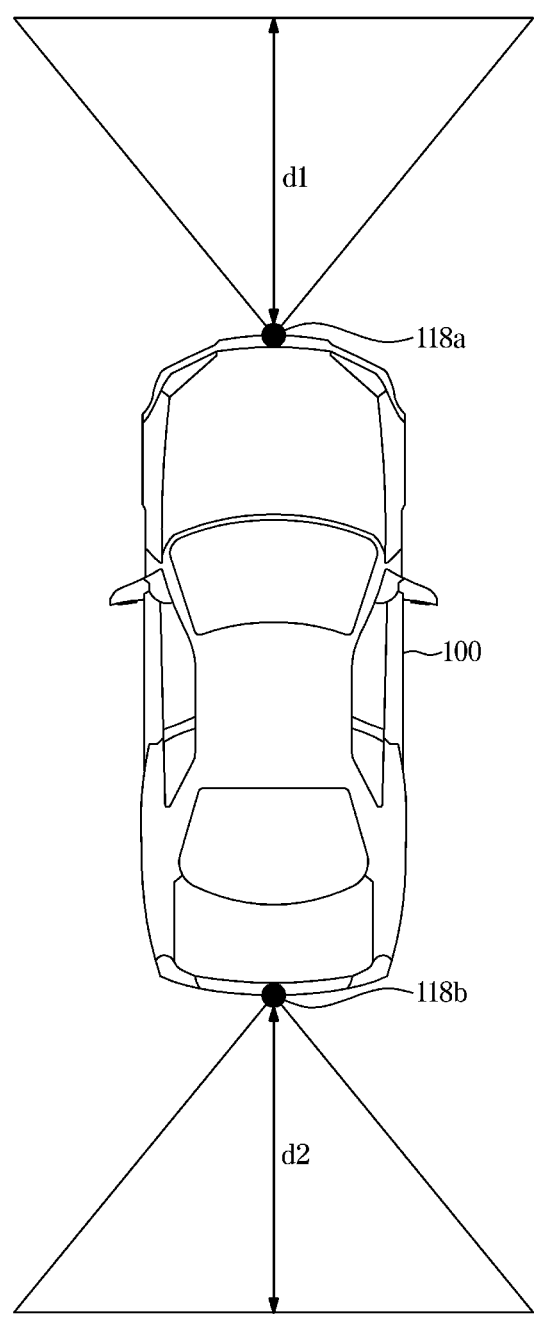
FIG. 3 is an exemplary view of a field of view of the first and second image acquisition units provided in the vehicle in one form of the present disclosure.

FIG. 2 is a control block diagram of a vehicle provided with an advanced driver assistance apparatus in some forms of the present disclosure, and FIG. 3 is an exemplary view of a field of view of the first and second image acquisition units provided in the vehicle in some forms of the present disclosure.

As shown in FIG. 2, the vehicle 100 includes a plurality of image acquisition units 118, a terminal 120, a plurality of lane recognizers 130: 131 and 132, a detector 140, and a position receiver 150, a controller 160 and a storage 161, and further include a sound output unit 123 and a cluster 124.

The terminal 120 may include an input unit 121 and a display 122.

The input unit 121 of the terminal 120 receives input of an operation command of at least one of a lane departure warning mode and an autonomous driving control mode.

The input unit 121 may receive an operation command of at least one of a navigation mode and a map display mode.

The input unit 121 may receive input of destination information in the navigation mode or the autonomous driving control mode.

The display 122 of the terminal 120 displays the information that is not recognizable in the forward lane.

The display 122 may also display failure information of at least one image acquisition unit, and display failure information of at least one lane recognizer.

The display 122 may also display hardware failure or software failure information, which is a kind of failure.

The display 122 may display lane departure warning information, navigation information, and autonomous driving control information, and may also display an image around the vehicle in the autonomous driving control mode.

The display 122 may display a high quality image, a low quality image, or a top view image when displaying an image around a vehicle. Here, the top view image may be a top view image in an around view form.

The display 122 displays a map image within a predetermined range from the current position of the vehicle in the map display mode, displays map information matched with route information from the current position to the destination in the navigation mode, and displays road guidance information.

The vehicle may further include a sound output unit 123 as an output unit, in addition to the display 122 of the terminal 120, and may further include a cluster 124.

The sound output unit 123 outputs at least one failure information of the at least one image acquisition unit and the line recognizer as sound. The sound may include a warning sound.

The sound output unit 123 may output, as a sound, the unable-to-perform information in the autonomous driving mode in response to the failure of at least one of the at least one image acquisition unit and the line recognizer.

The sound output unit 123 may also output lane departure warning information when the lane is normally recognized.

The sound output unit 123 may include at least one speaker provided in the vehicle.

The cluster 124 displays failure information of at least one of the at least one image acquisition unit and the lane recognizer.

The cluster 124 may also display the unable-to-perform information of autonomous driving control mode in response to the failure of at least one of the at least one image acquisition unit and the lane recognizer.

The cluster 124 may display lane departure warning information when the lane is normally recognized.

The cluster 124 may include at least one of a warning lamp and a display.

The cluster 124 may light the warning lamp in response to the failure information, or display the failure information as an image on the display.

The cluster 124 may light the warning lamp in response to the lane departure warning information or display the lane departure warning information as an image on the display.

The plurality of image acquisition units 118 acquires road images around the vehicle in real time.

The plurality of image acquisition units 118 may include a first image acquisition unit 118a for acquiring an image of a road in a forward direction of the vehicle and a second image acquisition unit 118b for acquiring an image of a road in a rear direction of the vehicle.

The plurality of image acquisition units 118 includes a first image acquisition unit 118a for acquiring an image of a road in a forward direction of the vehicle and a second image acquisition unit 118b for acquiring an image of a road in a rear direction of the vehicle.

The plurality of image acquisition units 118 convert shape information about an object around the vehicle into an electrical image signal, and receive image signals corresponding to the environment outside the vehicle, in particular, the road on which the vehicle travels, and the shape information of the front, rear, left and right side objects of the vehicle at the current position of the vehicle, to the lane recognizer 130.

The plurality of image acquisition units 118 may acquire an image of a road in real time or periodically.

When the plurality of image signals acquired by the plurality of image acquisition units are received, the lane recognizer 130 performs image processing based on the received image signals, and recognizes the lane of the road based on the information of the image processed images.

The lane recognizer 130 includes the first lane recognizer 131 which is connected to the first image acquisition unit 118a and recognizes the first lane in the first image acquired by the first image acquisition unit 118a, and a second lane recognizer 132 which is connected to the second image acquisition unit 118b and recognizes a second lane in the second image acquired by the second image acquisition unit 118b.

In addition, when the number of image acquisition units is three or more, the number of lane recognizers may also be three or more.

That is, one image acquisition unit and one lane recognizer may be configured as a set.

The detector 140 detects driving information of the vehicle.

The detector 140 may further include a speed detector configured to detect a driving speed of the vehicle.

The speed detector may include a plurality of wheel speed sensors respectively provided on the plurality of wheels of the vehicle, and may include an acceleration sensor that detects the acceleration of the vehicle.

The position receiver 150 receives position information of the vehicle and transmits the received position information to the controller 160.

The position receiver 150 may include a GPS (Global Positioning System) receiver that communicates with a plurality of satellites to calculate a position of the vehicle.

The position receiver 150 includes a GPS (Global Positioning System) signal receiving unit and a signal processing unit which processes a GPS signal acquired by the GPS signal receiving unit.

The GPS (Global Positioning System) signal receiving unit includes an antenna for receiving signals of a plurality of GPS satellites. This antenna may be provided on the exterior of the vehicle.

The signal processing unit of the position receiver 150 includes software configured to acquire a current position using distance and time information corresponding to position signals of a plurality of GPS satellites, and an output unit configured to output acquired position information of the vehicle.

In addition, the vehicle may include a first position receiver disposed adjacent to the first image acquisition unit and a second position receiver disposed adjacent to the second image acquisition unit.

The vehicle may also include a position receiver provided adjacent to the first image acquisition unit and the second image acquisition unit.

In this case, the first image acquisition unit and the second image acquisition unit may be provided in the vehicle body, but may be provided at the same position. In this case, the field of view of the first image acquisition unit may face the front of the vehicle, and the field of view of the second image acquisition unit may face the rear of the vehicle.

When the first image is acquired by the first image acquisition unit, the controller 160 may store the acquired first image together with driving speed, time information, and position information of the road, and also store the recognized information of the lane together.

When the second image is acquired by the second image acquisition unit, the controller 160 may store the acquired second image together with time information and also store the recognized information of the lane together The controller 160 determines the failure of at least one of the first lane recognizer and the first image acquisition unit by comparing the information of the first lane recognized in the first image with the information of the second lane recognized in the second image, and controls to output failure information when at least one failure of the first lane recognizer and the first image acquisition unit is determined.

The controller 160 may identify a first image corresponding to the second image among the first images based on the time information on which the second image was acquired, the length information of the vehicle body, the driving speed information, and the time information on which the stored first images were acquired, and compares the information of the second lane in the second image with the information of the identified first lane in the first image.

When comparing the information of the first lane and the information of the second lane, the controller 160 may select any one first image from among the first images acquired by the first image acquisition unit, may identify driving speed and time information when the selected first image is acquired, may identify the time difference of the image acquisition between the first image acquisition unit and the second image acquisition unit based on the identified driving speed, pre-stored length information of the vehicle body, and field of view information of the second image acquisition unit, may identify the second image acquired at the position of the road in the selected first image among the second images acquired by the second image acquisition unit based on the time information of the first image and the identified time difference, and may compare the information of the lane recognized in the identified second image with the information of the lane recognized in the selected first image.

The length information of the vehicle body pre-stored may be distance information between the first image acquisition unit and the second image acquisition unit.

That is, when the first image is acquired through the first image acquisition unit provided at the front of the vehicle body, and the second image is acquired through the second image acquisition unit provided at the rear of the vehicle body after traveling as much as the length of the vehicle body, the first image acquisition unit and the second image acquisition unit may acquire an image of a road at the same position. The first image acquisition unit and the second image acquisition unit may acquire an image of a road in the same area. As a result, the controller 160 may use the driving speed of the vehicle to determine whether the vehicle travels by the length of the vehicle body.

The controller 160 may identify information of the current position of the vehicle when the first image is acquired by the first image acquisition unit when comparing the information of the first lane and the information of the second lane, may predict information of a future position of the vehicle to be received by the position receiver when the controller 160 can acquire an image at the current position by the second image acquisition unit based on the identified information of the current position of the vehicle and the length information of the vehicle body pre-stored, and may compare the lane in the second image acquired by the second image acquisition unit with the lane in the acquired first image when the position received through the position receiver is a predicted future position.

When the first and second position receivers are provided, the controller 160 may identify the first position information received by the first position receiver when the first image is acquired by the first image acquisition unit, may identify the second position information received from the second position receiver, and may compare the information of the lane of the first image and the information of the lane of the second image acquired by the second image acquisition unit when the identified second position information is the same as the first position information.

When the first image is acquired by the first image acquisition unit, the first position information received by the first position receiver may correspond to position information of a road in the first image acquired by the first image acquisition unit. The position of the road in the second image acquired by the second image acquisition unit when the identified second position information is the same as the first position information is the same as the position of the road in the first image acquired by the first image acquisition unit.

The controller 160 may acquire the change information of the position based on the position information received from the position receiver, may acquire the distance information of the vehicle based on the acquired change information of the position, and may acquire a second image having an image of a road having the same position as the position of the road in the first image among the second images acquired by the second image acquisition unit based on the acquired distance information and the distance information between the first and second image acquisition units The controller 160, when comparing the information of the lane recognized in the first and second images, may compare the information of the lanes in the first and second images based on the distance of the road in the image acquired by the image acquisition unit having a smaller field of view among the view of the first field of view of the first image acquisition unit and the second field of view of the second image acquisition unit. This will be described with reference to FIGS. 3 and 4.

As shown in FIG. 3, the first field of view of the first image acquisition unit 118*a* may be an area capable of acquiring an image up to a first distance d1 forward from the front panel of the vehicle, and the second field of view of the second image acquisition unit 118*b* may be an area capable of acquiring an image up to a second distance d2 rearward from the rear panel of the vehicle. The first distance may be shorter than the second distance, may be long, or may be the same as the second distance.

If the first distance is longer than the second distance and the first image acquisition unit 118*a* is able to acquire the image of the road to a distance farther than the second image acquisition unit 118*b*, the controller 160 recognizes the first lane only in some image among first images acquired by the first image acquisition unit based on the second distance of the second field of view of the second image acquisition unit.

Figure 4A:
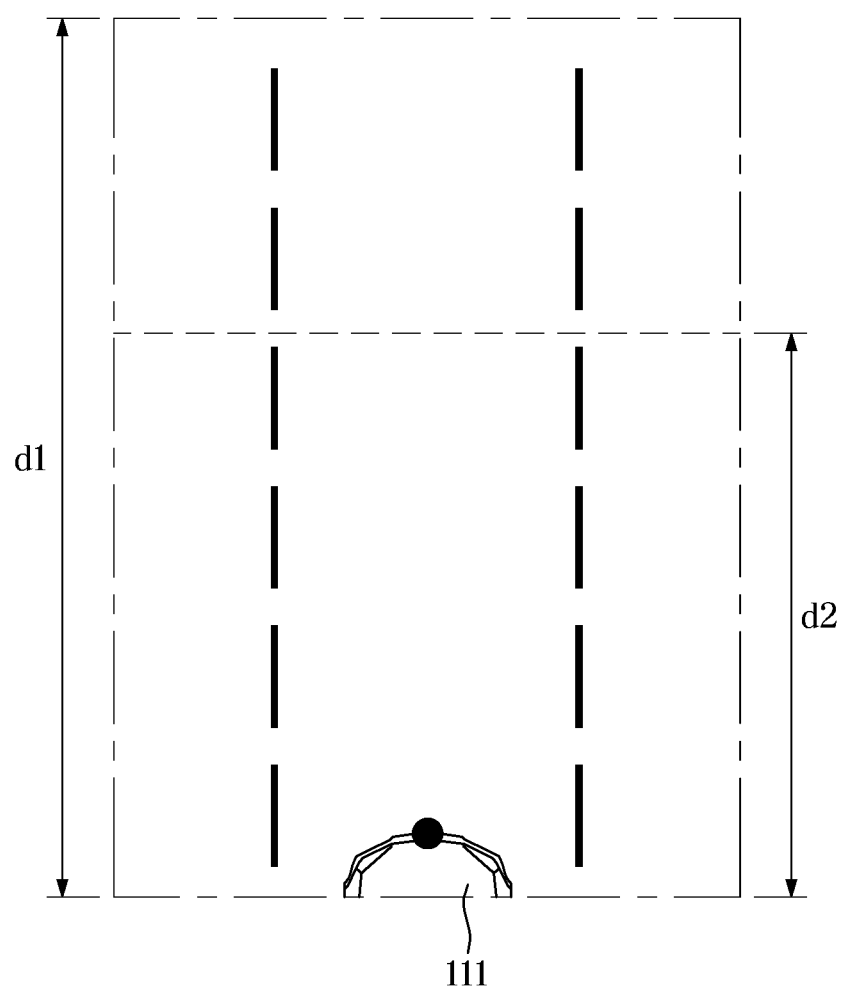
FIGS. 4A and 4B are diagrams illustrating first and second images acquired by the first and second image acquisition units of a vehicle in one form of the present disclosure.
Figure 4B:
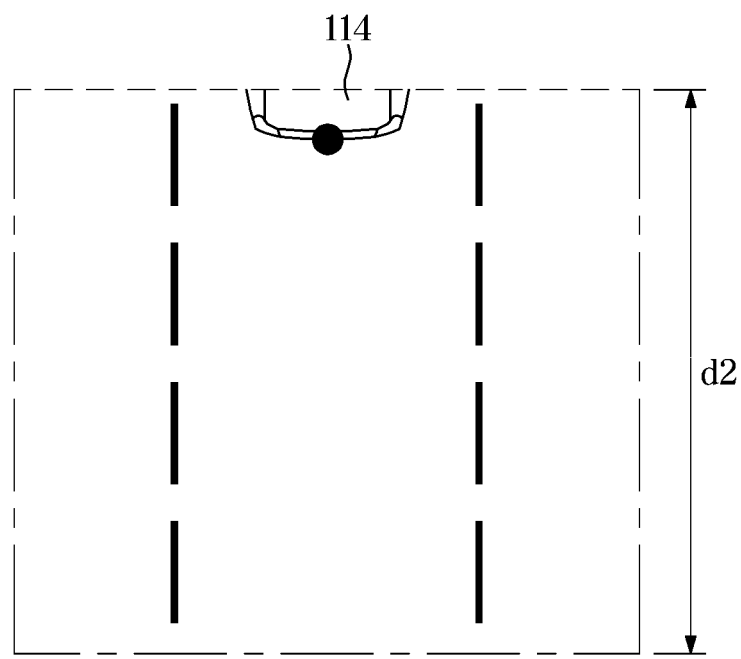

As shown in FIG. 4A, the first image acquired by the first image acquisition unit may be an image of a road from the front panel (or the front of the vehicle body) to the first distance, and as shown in FIG. 4B, the second image acquired by the second image acquisition unit may be an image of a road from the rear panel (or the rear side of the vehicle body) to the second distance.

The controller 160 may identify a partial region corresponding to the image from the front panel to the second distance among the entire regions of the first image, and may identify information of the first lane within in the partial region of the identified region of the first image.

The controller 160 may acquire a second image having an image of a road having the same position as the position of the road in the first image among the second images acquired by the second image acquisition unit, based on at least one of time information when the first image is acquired through the first image acquisition unit, driving speed, length of the vehicle body, field of view information of the second image acquisition unit, and position information of the vehicle.

The controller 160 may determine at least one failure of the second lane recognizer and the second image acquisition unit by comparing the information of the lane recognized in the first image with the information of the lane recognized in the second image.

The controller 160 may determine whether the lane departs based on the information of the lane recognized by the second lane recognizer when it is determined that at least one failure of the first lane recognizer and the first image acquisition unit is determined, and may control the autonomous driving based on the information of the lane recognized by the second lane recognizer 132 when the autonomous driving control mode is being performed.

When it is determined that at least one failure of the first lane recognizer and the first image acquisition unit is determined, the controller 160 corrects the lane recognized by the first lane recognizer based on the information of the lane recognized by the second lane recognizer.

When comparing the information of the lane recognized in the first and second images, the controller 160 determines whether the failure is a hardware failure or a software failure based on the compared information, and corrects the lane recognized by the first lane recognizer based on the information of the lane recognized by the second lane recognizer when determined to be a software failure.

The controller 160 recognizes the lane through the first lane recognizer, and determines that a software failure occurs when the match rate between the information of the lane recognized by the first lane recognizer and the information of the lane recognized by the second lane recognizer is equal to or less than the first predetermined value and exceeds the second predetermined value. That is, the controller 160 corrects the lane recognized by the first lane recognizer based on the information of the lane recognized by the second lane recognizer by determining that the lane is misrecognized by the first lane recognizer.

The controller 160 may control the output of lane departure warning information and autonomous driving using the information of the lane recognized by the second lane recognizer, by determining that the match rate between the information of the lane recognized by the first lane recognizer and the information of the lane recognized by the second lane recognizer is equal to or less than the second predetermined value and when it is determined that at least one lane of both lanes is not recognized. Here, the second predetermined value may be a value smaller than the first predetermined value.

The controller 160, when the hardware failure is determined, may stop the lane departure warning mode and the autonomous driving control mode, and may control the output of the interruption information The controller 160 may identify the ratio between the preset driving time and the number of failure determinations and may diagnose the failure when the identified ratio exceeds the reference ratio.

The controller 160 identifies the driving speed of the vehicle while driving and controls not to perform the failure diagnosis mode if the identified driving speed is less than the reference speed, and to perform the failure diagnosis mode if the driving speed is more than the reference speed.

The controller 160 identifies the information of the current position of the vehicle, identifies the road type at the current position based on the identified current position information and the road information in the map, and controls not to perform the failure diagnosis mode if the identified road type is an unpaved type, and to perform the failure diagnosis mode if the identified road type is a pavement type.

The controller 160 may not perform the failure diagnosis mode when the identified road type is an unpaved type and the identified driving speed is less than the reference speed.

The controller 160, when the storage space of the storage is insufficient, may secure the storage space of the storage by deleting the image having the oldest storage period.

The controller 160, when the storage period of the image stored in the storage is a preset storage period, may delete the image stored in the storage.

Figure 5:
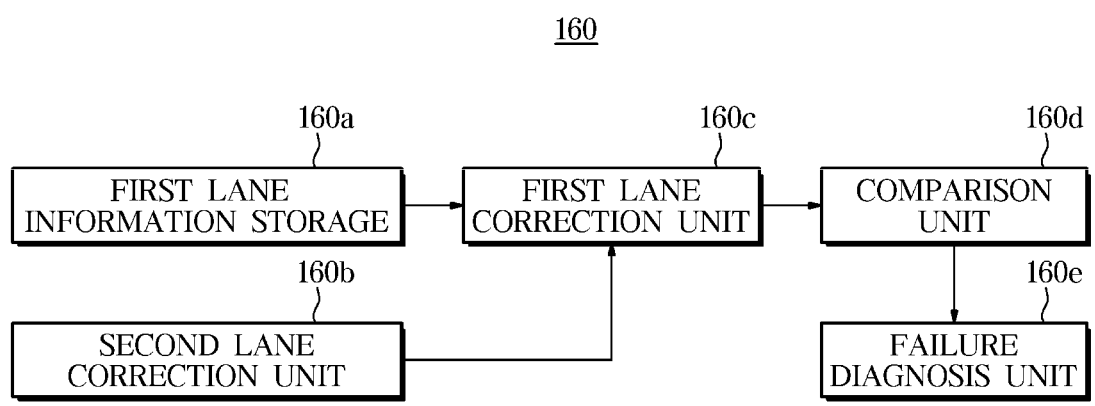
FIG. 5 is a detailed block diagram of a controller of a vehicle in one form of the present disclosure.

As shown in FIG. 5, the controller 160 may include a first lane information storage 160a, a second lane correction unit 160b, a first lane correction unit 160c, a comparison unit 160d, and a failure diagnosis unit 160e.

The information of the first lane storage 160a stores the first image acquired by the first image acquisition unit, but stores information of the first lane in the first image. The information of the first lane storage 160a may store the first image received in real time or periodically, and may store position information, time information, and driving speed information on the received first image together with the information of the first lane.

Since the first image acquired by the first image acquisition unit is acquired earlier than the second image acquired by the second image acquisition unit, it is necessary to store the first image in order to compare the first image and the second image having the road image of the same position, The information of the first lane storage 160a may have a storage capacity capable of storing the first image acquired in real time up to a point of time traveling by a distance corresponding to the vehicle body length at a reference driving speed.

For example, if the driving speed of the vehicle is less than the reference driving speed, the driving time of driving by the distance corresponding to the length of the vehicle body, when the vehicle travels by the distance corresponding to the length of the vehicle body, becomes long. This means that it is longer than the driving time when the vehicle travels by a distance corresponding to the length of the vehicle body above the reference driving speed.

Accordingly, the image is continuously acquired through the first image acquisition unit during an extended driving time. As a result, the amount of images acquired by the first image acquisition unit increases. Therefore, the storage capacity for storing the first image should also be increased.

Since the failure diagnosis mode is performed only when the reference driving speed is equal to or greater than the reference driving speed, the reference driving speed may be the slowest speed among the driving speeds at which the failure diagnosis mode is performed. Accordingly, the information of the first lane storage 160a may have a storage capacity capable of storing the acquired image during the driving time by a distance corresponding to the length of the vehicle body at the reference driving speed.

In addition, the controller may further include a second lane information storage. The information of the second lane storage may store time information on the received second image together with the information of the second lane.

The second lane correction unit 160b corrects the information of the second lane in the second image recognized by the second lane recognizer.

The first lane correction unit 160c corrects the information of the first lane in the stored first image based on the corrected information of the second lane.

The first lane correction unit 160c identifies the first image corresponding to the second image based on time information when the second image is acquired, length information of the vehicle body, driving speed information, and time information when each of the first images is acquired, and corrects the information of the first lane in the identified first image based on the corrected information of the second lane.

The first image corresponding to the second image is a first image acquired by acquiring an image of a road at the same position as that of a road in the second image.

The first lane correction unit 160c may acquire time information on which the first image corresponding to the second image is acquired, based on time information when the second image is acquired, length information of the vehicle body, and driving speed information, and may identify the first image having the acquired time information.

The comparison unit 160d compares the corrected information of the first lane in first image and the information of the corrected second lane.

The comparison unit 160d may determine whether the corrected information of the first lane in the first image and the corrected information of the second lane are comparable, and if it is determined that the comparison is possible, may compare the information of the first lane and the corrected information of the second lane in the identified first image.

For example, the comparison algorithm may be Euclidean distance.

The comparison unit 160d may acquire a match rate between the corrected information of the first lane in the first image and the corrected information of the second lane.

The failure diagnosis unit 160e diagnoses at least one failure of the first image acquisition unit and the first lane recognizer based on the information compared by the comparison unit 160d, and outputs failure information when the failure diagnosis result is a failure.

The failure diagnosis unit 160e determines that at least one of the first image acquisition unit and the first lane recognizer is a failure based on the number of times determined as the failure during the preset driving time.

That is, the failure diagnosis unit 160e determines that at least one of the first image acquisition unit and the first lane recognizer is a failure when the number of times determined as the failure during the preset driving time exceeds the reference ratio and determines that the state of the first image acquisition unit and the first lane recognizer is normal when the number of times determined as the failure during the preset driving time is less than or equal to the reference ratio.

The failure diagnosis unit 160e may determine that at least one of the first image acquisition unit and the first lane recognizer is a failure, when a match ratio between the information of the first lane in the identified first image and the corrected information of the second lane is less than the first predetermined value.

The controller 160 may be implemented as a memory (not shown) that stores data about an algorithm the algorithm for controlling the operation of the driver assistance apparatus or the components in the vehicle, or a program that reproduces the algorithm, and a processor (not shown) that performs the above-described operation using data stored in the memory. In this case, the memory and the processor may be implemented as separate chips. Alternatively, the memory and the processor may be implemented in a single chip.

At least one component may be added or deleted to correspond to the performance of the components of the vehicle illustrated in FIG. 2 and the controller illustrated in FIG. 5. In addition, it will be readily understood by those skilled in the art that the mutual position of the components may be changed corresponding to the performance or structure of the system.

The storage 161 stores first field of view information of the first image acquisition unit and second field of view information of the second image acquisition unit.

The first field of view information of the first image acquisition unit may include distance information obtainable by the first image acquisition unit. The second field of view information of the second image acquisition unit may include distance information obtainable by the second image acquisition unit.

That is, the first image acquisition unit may acquire an image of the road by the first distance forward from the front panel of the vehicle, and the second image acquisition unit may acquire an image of the road by the second distance rearward from the rear panel of the vehicle.

The storage 161 stores distance information between the first image acquisition unit and the second image acquisition unit.

The storage 161 may store distance information corresponding to the length of the vehicle body.

The storage 161 may store a reference driving speed for determining whether to perform the failure diagnosis mode.

The storage 161 stores map information and road information in the map. The road information may be unpaved roads and pavement roads, and may be road type information on whether lanes exist.

The storage 161 may store the first image acquired by the first image acquisition unit and the second image acquired by the second image acquisition unit.

The storage 161 may delete some images stored according to a control command of the controller 160.

The storage 161 may match and store time information and position information when the image is acquired, with the image information.

The storage 161 may match and store the acquired image information with lane position information.

The storage 161 may also store a storage period of an image for permanently deleting the stored image.

The storage 161 may store various data for operations of the entire vehicle 100, such as a program for processing or controlling the controller 160.

The storage 161 may be a memory implemented as a chip separate from the processor described above with respect to the controller 160, or may be implemented as a single chip with the processor.

The storage 161 may be implemented as at least one of a nonvolatile memory device such as a cache, a read only memory (ROM), a programmable ROM (PROM), an erasable programmable ROM (EPROM), an electrically erasable programmable ROM (EEPROM), and a flash memory, or a volatile memory device such as Random Access Memory (RAM), or a storage medium such as Hard Disk Drive (HDD) and CD-ROM.

The vehicle may further include a communication unit. The controller of the vehicle may communicate with other vehicles, infrastructure, and servers through the communication unit, and may control autonomous driving based on the recognized information of the lane.

Figure 6:
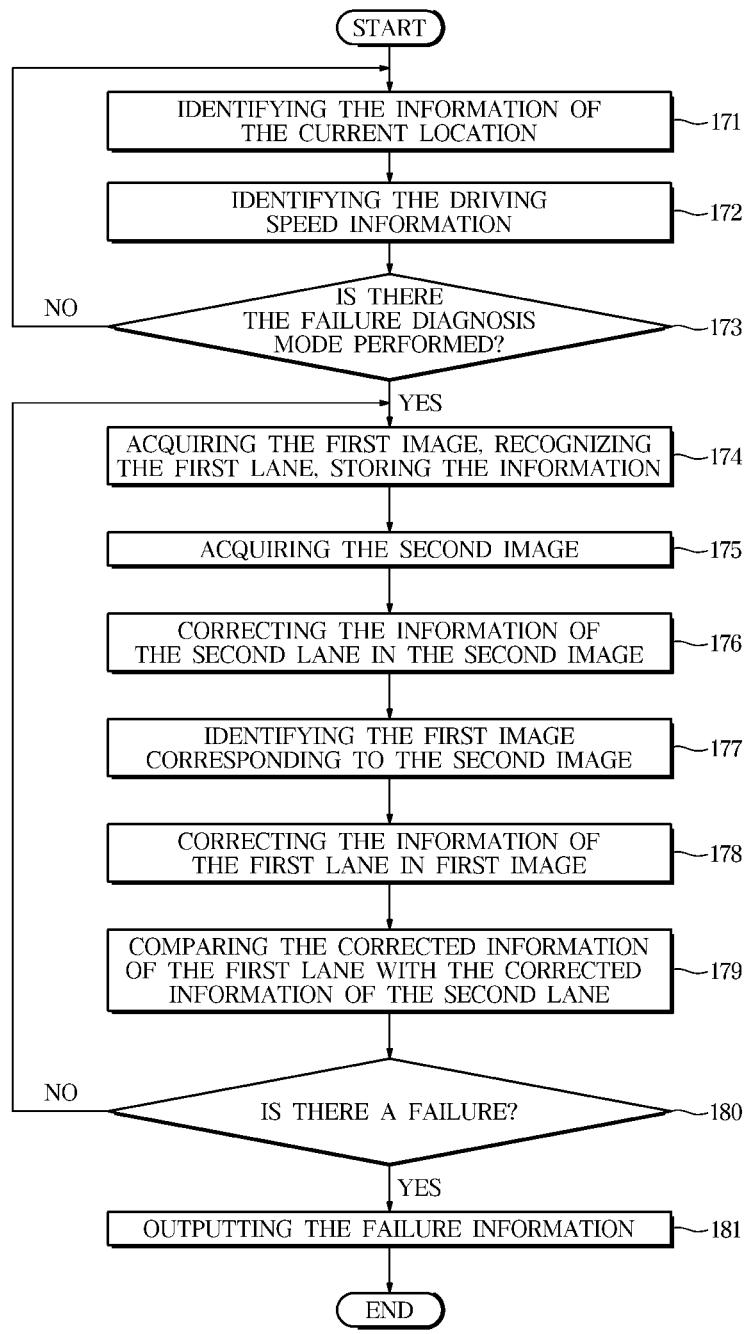
FIG. 6 is a control block diagram of a vehicle in one form of the present disclosure.

FIG. 6 is a control block diagram of a vehicle in some forms of the present disclosure. This will be described with reference to FIGS. 7, 8A, 8B, and 8C.

The vehicle identifies 171 information of the current position of the vehicle received by the position receiver while driving, and identifies 172 the driving speed information of the vehicle detected by the detector.

The vehicle determines 173 whether to perform the failure diagnosis mode based on at least one of the identified current position information and the identified driving speed.

For example, when the driving speed corresponding to the identified driving speed information is less than the reference speed, the vehicle does not perform the failure diagnosis mode, and when the driving speed is more than the reference speed, the vehicle performs the failure diagnosis mode.

As another example, the vehicle identifies the road type at the current position based on the identified current position information and the road information in the map, and the vehicle does not perform a failure diagnosis mode when the identified road type is an unpaved type, and performs a failure diagnosis mode when the identified road type is a pavement type.

As another example, the vehicle may not perform the failure diagnosis mode when the identified road type is an unpaved type and the identified driving speed is less than the reference speed.

When the vehicle performs the failure diagnosis mode, the vehicle acquires an image (i.e. a first image) of a road in front of the vehicle by using the first image acquisition unit, recognizes the first lane from the acquired first image, and stores 174 information of the recognized first lane in the first image.

The vehicle may acquire the first image periodically or in real time, recognize the first lane from the acquired first image whenever the first image is acquired, and store the information of the recognized first lane.

When the vehicle stores the information of the first lane in the first image, the vehicle stores time information, position information, and driving speed information acquired with the first image.

The vehicle, when storing the information of the first lane in the first image, stores time information acquired with the first image, position information, and driving speed information.

The vehicle acquires 175 an image (i.e. the second image) of the road behind the vehicle by using the second image acquisition unit, recognizes the second lane from the acquired second image, and corrects 176 the information of the recognized second lane.

Figure 8A:
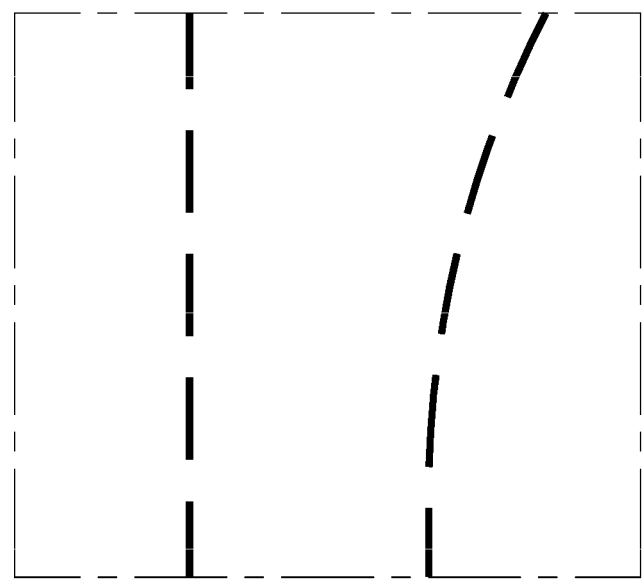
FIGS. 8A, 8B and 8C are exemplary views of image correction of a vehicle in one form of the present disclosure.
Figure 8B:
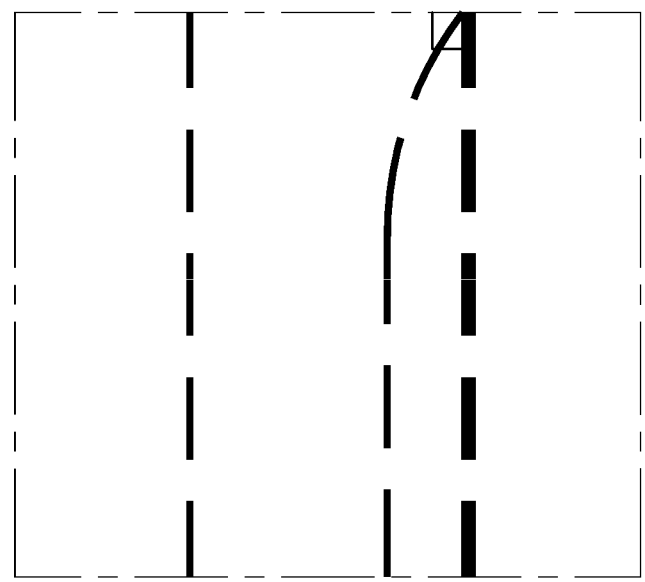

The vehicle corrects the tangent of the portion where the left or right lane meets the rear of the vehicle with respect to the front of the vehicle so that the tangential of the vehicle is perpendicular to the rear of the vehicle (see FIG. 8B).

The vehicle may acquire the second image periodically or in real time, and recognize the second lane from the acquired second image whenever the second image is acquired, and correct the information of the recognized second lane In addition, when the vehicle stores the information of the second lane in the second image, the vehicle may also store time information when the second image is acquired.

The vehicle identifies 177 a first image corresponding to the second image acquired among the stored first images based on time information when the second image is acquired, length information of the vehicle body and driving speed information, and time information when each of the stored first images is acquired.

Here, the first image corresponding to the second image is a first image acquired by acquiring an image of a road having the same position as that of the road in the second image.

More specifically, the vehicle may acquire time information on which the first image corresponding to the second image is acquired based on time information when the second image is acquired, length information of the vehicle body, and driving speed information, and may identify a first image having time information acquired from among the stored first images.

Figure 7:
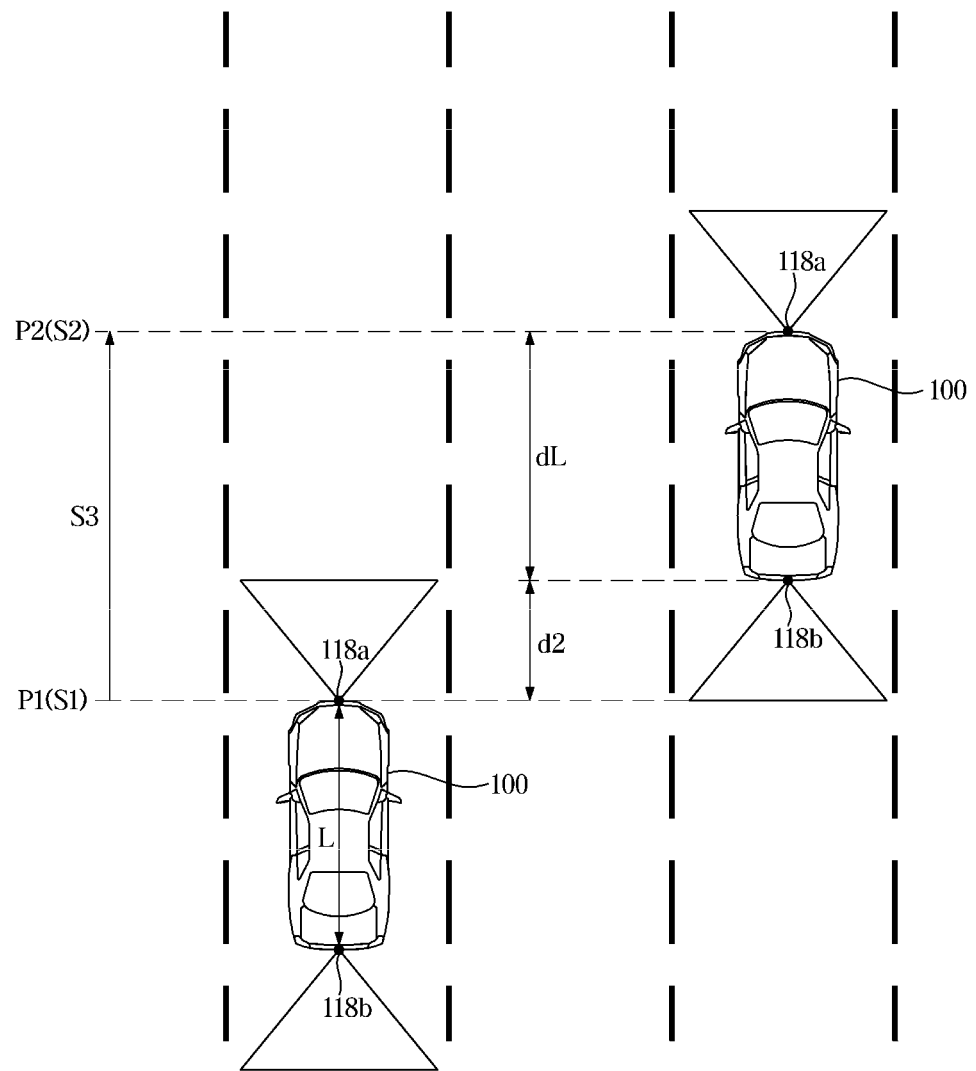
FIG. 7 is exemplary views of acquiring first and second images of a vehicle in one form of the present disclosure.

As shown in FIG. 7, the vehicle 100 acquires an image of a road at a first time s1 at a first point p1 through the first image acquisition unit 118a, acquires an image of a road by a first distance d1 corresponding to the first field of view and stores the acquired image of the road (i.e. the first image).

While the vehicle continues to travel, the vehicle acquires and stores a first image of a road in real time by a distance corresponding to the first field of view through the first image acquisition unit 118a. That is, the vehicle may store a plurality of first images.

When the vehicle stores the first images acquired in real time, the vehicle may store the time information on which the first image is acquired and may further store position information.

When the vehicle travels by the distance dL+d2 obtained by adding the second distance dL corresponding to the length L of the vehicle body and the distance d2 corresponding to the second field of view, the vehicle acquires the image of the road at the second time p2 at the second point p2 through the second image acquisition unit 118b, but the vehicle acquires the image of the road corresponding to the distance d2 corresponding to the second field of view (i.e. second image).

Here, the second time s2 may be a time obtained by adding the third time s3 and the first time s1 that are required to move by the distance summed at the detected driving speed.

The vehicle identifies the time at which the first image corresponding to the second image was identified based on the second time and the third time, and identifies the first image having time information corresponding to the identified time.

The first image corresponding to the second image refers to a first image having an image of a road at the same position as that of a road in the second image.

The second image may be a corrected second image.

In addition, the vehicle may recognize by using a dead reckoning technique based on the position information received from the position receiver and the driving information (e.g. steering angle, driving speed, etc.) of the vehicle in order to accurately recognize the time when the first image was acquired.

The relationship between time, body length l, and driving speed v is as follows.

$$l+x=\int_{s1}^{s1+s3} vdt, l(m), v(m/s)$$

When the field of view from the first image acquisition unit and the second image acquisition unit is different from each other, the vehicle, may acquire an image of a road up to a first distance d1 corresponding to the first field of view through the first image acquisition unit as shown in FIG. 4A, and may acquire an image of a road up to a second distance d2 corresponding to the second field of view through the second image acquisition unit as shown in FIG. 4B.

Accordingly, the vehicle image-processes the identified first image based on the second distance d2 corresponding to the second field of view of the second image acquisition unit.

As illustrated in FIG. 4A, the image processing of the first image includes leaving an area from a portion adjacent to the front panel to a portion corresponding to the second distance among the entire regions of the identified first image, and deleting the remaining region.

The vehicle corrects 178 the information of the first lane in the identified first image based on the corrected information of the second lane.

The vehicle compares 179 the corrected information of the first lane in the first image with the corrected information of the second lane.

FIG. 8A is information of the first lane in the identified first image, and FIG. 8B is the corrected information of the second lane in second image.

Figure 8C:
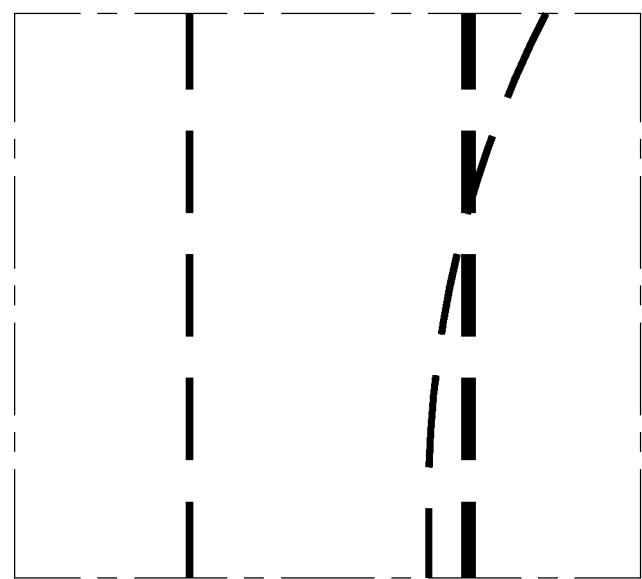

As illustrated in FIG. 8C, the vehicle may correct the information of the first lane in the identified first image based on the corrected information of the second lane in the second image.

The vehicle may determine whether it is comparable between the corrected information of the first lane in the first image and the corrected information of the second lane, and if determined to be comparable, may compare the corrected information of the first lane in the first image and the information of the corrected second lane.

Determining whether it is comparable between the corrected information of the first lane in the first image and the corrected information of the second lane, includes determining whether the recognized first lane information in the first image is present, and determining whether the recognized second lane information in the second image is present.

When the vehicle compares the corrected information of the first lane in the first image with the corrected information of the second lane, the vehicle may acquire a match rate between the corrected information of the first lane in the first image and the corrected information of the second lane.

The vehicle diagnoses a failure of at least one of the first image acquisition unit and the first lane recognizer based on comparison information comparing the corrected information of the first lane in the first image and the corrected information of the second lane, If the diagnosis result is fault 180, fault information is output 181.

The outputting of the failure information may include displaying the failure information in an image through the display of the terminal.

The outputting of the failure information may include turning on a warning lamp of the cluster, and may include displaying the failure information to an image through a display provided in the cluster.

In addition, the outputting the fault information may display the fault information through the head-up display (HUD), may output a warning sound through the sound output unit, and may turn on a warning lamp provided in the interior of the vehicle.

The vehicle may also determine the failure of at least one of the first image acquisition unit and the first lane recognizer based on the number of times determined as the failure during the preset driving time in diagnosis of the failure.

For example, if the number of times determined as a failure during the preset driving time exceeds a reference ratio, the vehicle determine the failure of at least one of the first image acquisition unit and the first lane recognizer, and if the number of times determined as a failure during the preset driving time is less that or equal to the reference ratio, the vehicle determines that the states of the first image acquisition unit and the first lane recognizer are normal.

In addition, the vehicle determines a failure of at least one of the first image acquisition unit and the first lane recognizer, when the match ratio between the information of the first lane in the corrected first image and the information of the corrected second lane is less than the first predetermined value.

In addition, during the diagnosis of a failure, the vehicle may determine whether it is a hardware failure or a software failure.

For example, the vehicle may determine that a software is a failure when the match rate between the corrected information of the first lane and the corrected information of the second lane is equal to or less than the first predetermined value and exceeds the second predetermined value, and may determine that the hardware is a failure when the match ratio between the information of the first lane and the corrected information of the second lane is less than or equal to the second predetermined value or at least one of the lanes is not recognized.

Here, the second predetermined value may be a value smaller than the first predetermined value.

If determined to be a software failure, the vehicle may correct the lane recognized by the first lane recognizer based on the information of the lane recognized by the second lane recognizer, and may maintain the lane recognition operation of the forward road based on the corrected information of the first lane.

If determined to be a hardware failure, the vehicle may output information on stopping the lane recognition operation, or may predict the lane of the forward road based on the corrected information of the second lane, and may maintain a lane recognition operation based on the information of the predicted lane of the forward road.

On the other hand, some forms of the present disclosure may be implemented in the form of a recording medium for storing instructions executable by a computer. Instructions may be stored in the form of program code and, when executed by a processor, may generate a program module to perform the operations of the disclosed forms of the present disclosure. The recording medium may be implemented as a computer-readable recording medium.

The computer-readable recording medium includes all kinds of recording media in which instructions that can be decoded by a computer. For example, there may be read only memory (ROM), random access memory (RAM), a magnetic tape, a magnetic disk, a flash memory, an optical data storage device, and the like.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An advanced driver assistance device comprising:
   a plurality of image acquisition units configured to acquire images of a road;
   a plurality of lane recognizers configured to:
   connect to the plurality of image acquisition units, respectively; and
   recognize lanes from the acquired images of the road;
   a controller configured to:
   determine whether at least one lane recognizer of the plurality of lane recognizers is faulty and whether at least one image acquisition unit connected to the at least one lane recognizer among the plurality of image acquisition units is faulty by comparing each of lane information recognized by the plurality of lane recognizers; and
   control to output failure information when the at least one lane recognizer and the at least one image acquisition unit are determined to have the failure; and an output unit configured to output the failure information, wherein the plurality of image acquisition units includes a first image acquisition unit configured to acquire a first image of the road and a second image acquisition unit configured to acquire a second image of the road, wherein, when each of the lane information recognized by the plurality of lane recognizers is compared, the controller is configured to:
identify an image acquisition unit having a smallest view between a view of the first image acquisition unit and a view of the second image acquisition unit;
identify distance information of the road corresponding to the smallest view of the identified image acquisition unit;
identify the first image of the first image acquisition unit that is acquired at the same position of the road where the second image is acquired based on time information of the second image acquired by the second image acquisition unit, the identified distance information, length information of a vehicle body and a driving speed detected by a detector; and
compare a first lane with a second lane.

2. The advanced driver assistance device of claim 1, further comprising:
a position receiver configured to receive current position information of at least one image acquisition unit of the plurality of image acquisition units; and
a storage configured to:
store distance information between at least one image acquisition unit of the plurality of image acquisition units and remaining image acquisition units of the plurality of image acquisition units; and
store visual field information of the plurality of image acquisition units,
wherein, when comparing each of the lane information, the controller is configured to:
identify an image of the road that matches the current position information received by the position receiver from among the images of the road acquired by the remaining image acquisition units of the plurality of image acquisition units based on the received current position information, the stored distance information, and the visual field information; and
compare the lane information in the identified image of the road with the lane information in the images of the road acquired by at least one image acquisition unit of the plurality of image acquisition units.

3. The advanced driver assistance device of claim 1, further comprising:
a position receiver configured to receive current position information; and
a storage configured to store position information of the road and a road type in a map,
wherein the controller is configured to determine whether the failure has occurred based on the current position information received by the position receiver and the stored position information of the road.

4. The advanced driver assistance device of claim 1, wherein the first image acquisition unit and the second image acquisition unit are configured to acquire the images of the road in different directions.

5. The advanced driver assistance device of claim 1, wherein the controller is configured to:
perform a lane departure warning or an autonomous driving based on the lane information in the images of the road when it is determined that the failure has occurred.

6. A vehicle comprising:
a first image acquisition unit configured to acquire a first image of a road;
a second image acquisition unit configured to acquire a second image of the road;
a first lane recognizer configured to recognize a first lane in the first image;
a second lane recognizer configured to recognize a second lane in the second image;
a detector configured to detect a driving speed; and
a controller configured to:
determine whether at least one of the first lane recognizer or the first image acquisition unit has a failure by comparing the first lane with the second lane; and
determine whether the vehicle deviates a lane based on the second lane when it is determined that at least one of the first lane recognizer or the first image acquisition unit has the failure, wherein, when comparing the first lane and the second lane, the controller is configured to:
identify an image acquisition unit having a smallest view between a view of the first image acquisition unit and a view of the second image acquisition unit;
identify distance information of the road corresponding to the smallest view of the identified image acquisition unit;
identify the first image of the first mace acquisition unit that is acquired at the same position of the road where the second image is acquired based on time information of the second image acquired by the second image acquisition unit, the identified distance information, length information of a vehicle body and the driving speed detected by the detector; and compare the first lane with the second lane.

7. The vehicle of claim 6, wherein the controller is configured to:
control an autonomous driving based on lane information in an autonomous driving mode.

8. The vehicle of claim 6, wherein the vehicle further comprises:
an output unit comprising at least one of a display or a speaker,
wherein the controller is configured to output lane deviation information through the output unit when the vehicle is determined to deviate the lane.

9. The vehicle of claim 6, wherein:
the first image acquisition unit is provided on the vehicle body and configured to face a front side of the vehicle,
the second image acquisition unit is provided on the vehicle body and configured to face a rear side of the vehicle,
the first image is a front image of the road, and
the second image is a rear image of the road.

10. The vehicle of claim 6, wherein the vehicle further comprises:
a position receiver configured to receive current position information; and
a storage configured to store position information of the road and a road type in a map,
wherein the controller is configured to determine whether the failure has occurred based on the current position information received by the position receiver and the position information of the road stored in the storage.

11. The vehicle of claim 6, wherein, when it is determined that the failure has occurred, the controller is configured to correct the first lane based on the second lane.

12. The vehicle of claim 6,
wherein the controller is configured to control a failure diagnosis mode when the driving speed detected by the detector is equal to or greater than a reference driving speed.

13. The vehicle of claim 12,
wherein the vehicle further comprises a storage configured to store the first image, and
wherein the storage has a storage capacity capable of storing the first image acquired in real time up to a point of time traveling by a distance corresponding to the length information of the vehicle body at the reference driving speed.

14. A method for controlling a vehicle, the method comprising:
acquiring, by a first image acquisition unit, a first image of a road while traveling;
acquiring, by a second image acquisition unit, a second image of the road while traveling;
recognizing, by a first lane recognizer, a first lane in the acquired first image;
recognizing, by a second lane recognizer, a second lane in the acquired second image;
determining, by a controller, whether at least one of the first lane recognizer or the first image acquisition unit has a failure by comparing the first lane with the second lane; and
outputting failure information when at least one of the first lane recognizer or the first image acquisition unit is determined to have the failure, wherein comparing the first lane and the second lane further comprises:
identifying an image acquisition unit having a smallest view between a view of the first image acquisition unit and a view of the second image acquisition unit;
identifying distance information of the road corresponding to the smallest view of the identified image acquisition unit,
identifying the first image of the first image acquisition unit that is acquired at the same position of the road where the second image is acquired based on time information of the second image acquired by the second image acquisition unit, the identified distance information, length information of a vehicle body and a driving speed detected by a detector; and
comparing the first lane with the second lane.

15. The method of claim 14, further comprising:
when at least one of the first lane recognizer or the first image acquisition unit is determined to have the failure, determining whether the vehicle deviates from a lane based on the second lane; and
controlling an autonomous driving based on the second lane in an autonomous driving mode.

16. The method of claim 14, further comprising:
identifying the driving speed;
identifying a current position of the vehicle;
identifying road information at the identified current position; and
determining whether to perform a failure diagnosis mode based on at least one of the identified road information or the identified driving speed.

17. The method of claim 14, further comprising:
when at least one of the first lane recognizer or the first image acquisition unit is determined to have the failure, correcting the first lane based on the second lane.

* * * * *